United States Patent
Krishnan et al.

(10) Patent No.: US 7,848,280 B2
(45) Date of Patent: Dec. 7, 2010

(54) TUNNEL OVERHEAD REDUCTION

(75) Inventors: Suresh Krishnan, Montreal (CA); Laurent Marchand, Montreal (CA)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 701 days.

(21) Appl. No.: 11/846,347

(22) Filed: Aug. 28, 2007

(65) Prior Publication Data

US 2008/0310344 A1 Dec. 18, 2008

Related U.S. Application Data

(60) Provisional application No. 60/944,183, filed on Jun. 15, 2007.

(51) Int. Cl.
*H04W 4/00* (2009.01)

(52) U.S. Cl. .................................. 370/328; 455/433

(58) Field of Classification Search .................. 370/328, 370/338, 389, 392, 474, 475; 455/432.1, 455/433
See application file for complete search history.

(56) References Cited

U.S. PATENT DOCUMENTS

| 7,173,905 B1 | 2/2007 | Alex et al. |
| 2006/0171365 A1* | 8/2006 | Borella .......................... 370/338 |
| 2006/0198345 A1* | 9/2006 | Chen ............................. 370/338 |
| 2006/0209768 A1* | 9/2006 | Yan et al. ..................... 370/338 |
| 2007/0049294 A1* | 3/2007 | Farley et al. ............. 455/456.1 |
| 2007/0091862 A1 | 4/2007 | Ioannidis |

FOREIGN PATENT DOCUMENTS

| WO | 00/57601 A1 | 9/2000 |
| WO | WO 03/107616 A1 | 12/2003 |
| WO | WO 2004/017597 A1 | 2/2004 |

OTHER PUBLICATIONS

W. Haddad et al., IP Tunneling Optimization in a Mobile Environment, Network Working Group, Internet Draft, Feb. 25, 2007.
International Search Report from corresponding application PCT/IB2008/051765.
V. Jacobson, Compressing TCP/IP Headers for Low Speed Serial Links, Network Working Group, RFC 1144, Feb. 1990.
D. Johnson et al., Mobility Support in IPv6, Network Working Group, RFC 3375, Jun. 2004.
C. E. Perkins, Mobile IPv6 & Cellular Telephony, Nokia, ICCT2000. PPT, Aug. 23, 2000.

* cited by examiner

*Primary Examiner*—Brian D Nguyen
(74) *Attorney, Agent, or Firm*—Benoit Yelle; Ericsson Canada Inc.

(57) ABSTRACT

Reduction of overhead normally caused by the addition of a second IP header in case of tunneling between a home agent and a mobile node located in a foreign network is achieved by replacing an encapsulated first IP header by a tunnel identifier. The home agent and the mobile node agree on a tunnel identifier value at the time of binding update and acknowledgement. The tunnel identifier may be used independently at the home agent and at the mobile node to reconstruct the first IP header, which identifies a correspondent node. Because the encapsulated first IP header is not terminated at either of the home agent or mobile node, overhead reduction is not impacted by eventual transmission error or loss between these two nodes.

16 Claims, 7 Drawing Sheets

| MN HoAs | CN IP ADDRESSES | TID |
|---|---|---|
| X1. X2. X3. X4 | K1. K2. K3. K4 | *abcd* |
| X1. X2. X3. X4 | L1. L2. L3. L4 | *qrst* |

*Fig. 3a*

| CN IP ADDRESSES | TID |
|---|---|
| K1. K2. K3. K4 | *abcd* |
| L1. L2. L3. L4 | *qrst* |

*Fig. 3b*

TUNNEL OVERHEAD REDUCTION

PRIORITY STATEMENT UNDER 35 U.S.C. S.119(e) & 37 C.F.R. S.1.78

This non-provisional patent application claims priority based upon the prior U.S. provisional patent application entitled "Tunnel Overhead Reduction", application No. 60/944,183, filed Jun. 15, 2007, in the names of Suresh Krishnan and Laurent Marchand.

BACKGROUND OF THE INVENTION

1. Field of the invention

The present invention relates to a mobile node and a home agent for reducing the overhead in tunneled data exchanged therebetween and a method therefor.

2. Description of the Related Art

The Internet Protocol (IP) allows the exchange of packets, or datagrams, between various nodes having IP addresses. A packet sent from a first node towards a second node comprises a header, itself comprising an IP address of the first node as a source address and an IP address of the second node as a destination address, and a useful payload. Traditionally, an IP address identifies, and is linked to, an attachment point of a node within a network. As a mobile node (MN) moves between IP networks, an IP address of a fixed, constant value cannot be used by various network elements to locate and communicate with the MN because distinct the MN has changed from one attachment point to another one. Mobile Internet Protocol version 6 (MIPv6) is a technology for providing a stable identifier, called a home address (HoA) to a mobile node while it is moving between multiple IP networks. This is established by mapping the HoA into a care-of address (CoA) that is representative of a current topological address of the MN. This mapping may be performed either by a home agent (HA), in a bidirectional tunneling mode, or by a correspondent node (CN) in communication with the MN, in a route optimized mode.

FIG. 1 is a prior art representation of a CN 120 in communication with a MN 110 within an IP network 100 using MIPv6 in bidirectional tunneling mode. The bidirectional tunneling mode works by tunneling all traffic from and to the MN 110 through a HA 130. Data sent from, or received at, the MN 110 is intended to, or initiated from, the CN 120. The CN 120 is aware of a HoA of the MN 110, which is an IP address related to a subscription of the MN 110 within a network which is, for that MN 110, its home network. Within the home network, the HA 130 allocates the HoA to the MN 110. When the CN 120 sends a data packet intended to the MN 110, it uses its own IP address as a source address and the HoA of the MN 110 as a destination address. The source and destination addresses are placed in an IP header, which is in turn placed in the data packet.

If the MN 110 is located within its home network, normal IP routing practices ensure that the data packet arrives at the MN 110 by use of its HoA. Specifically, the packet arrives at an ingress router of the home network. The router performs neighbor discovery for the HoA of the MN 110. The MN 110 being present on the link, it responds with its own link layer address and the router delivers the packet to the MN 110. If however the MN 110 is located outside of its home network, visiting a foreign network, as shown in FIG. 1, the foreign network has previously allocated a care-of address (CoA) to the MN 110. The MN 110 has informed the HA 130 of its current CoA in a so-called binding process. The HA 130 keeps binding information linking the HoA and the CoA of the MN 110. When the CN 120 sends the data packet towards the MN 110, on data path 160, it still uses the HoA of the MN 110 as the destination address and its own address as the source address in a first header. As the MN 110 is away, the HA 130 responds to the neighbor discovery with its own link layer address to get the packet from the router. The HA 130 forwards the data packet towards the MN 110 on a tunneled data path 150 by use of the CoA of the MN 110 as a new destination address. The HA 130 supplies its own IP address as a new source address in the packet sent towards the MN 110. The MN 110 needs to know the identity of the CN 120 it is communicating with, because this may, for example, impact an application of the MN 110. Moreover, the MN 110 may eventually send another data packet, for example a response, towards the CN 120. Such a response is sent through the HA 130 on the tunneled data path 150. The MN 110 sends the response intended to the CN 120, using the IP address of the HA 130 as a destination address and its CoA as the source address. The HA 130 forwards the response towards the CN 120 on the data path 160. The IP address of the CN 120 needs to be preserved, and the HA 130 must have a means to recognize the MN 110. The conventional means taken by the HA 130 and by the MN110 to ensure that addressing information of the CN 120 is preserved while packets travel between the HA and the MN on the tunneled data path 150 is by placing the first header, which identifies the HoA of the MN 110 and the CN 120, as a part of an enlarged payload, and by defining a second, additional IP header, to identify the CoA of the MN 110 and the HA 130. The first header is used conventionally between the CN 120 and the HA 130 on the data path 160 while the second header is added between the HA 130 and the MN 110 on the tunneled data path 150. Between the HA 130 and the MN 110, only the second header acts as a standard IP header and the first header is treated as any other payload content.

FIGS. 2a and 2b represent prior art packet formats used between the HA 130 and CN 120 and between the MN 110 and HA 120, respectively. On the data path 160 of FIG. 1, a data packet comprises a first header 210 and a useful payload 220, as shown on FIG. 2a. The first header 210 comprises a source address (SA) 212 equal to the IP address of the CN 120 and a destination address (DA) 214 equal to the HoA of the MN 110. This packet is sent from the CN 120 and, though it is intended for receipt at the MN 110, it can only arrive at the HA 130. In a reverse direction, the SA 212 and the DA 214 would exchange their values. On FIG. 2b, the data packet of FIG. 2a is tunneled into a larger packet, on the tunneled data path 150 of FIG. 1. It can be seen that the first header 210 from the packet as sent from the CN to the HA is added to the payload 220, to actually become a larger payload 240, and that a second header 230 is added. It can be said that the packet format of FIG. 2a is encapsulated within a packet format of FIG. 2b. The second header 230 comprises a SA 232 equal to the IP address of the HA 130, and a DA 234 equal to the CoA of the MN 110. In the reverse direction, the HA 130 may receive a packet formatted by the MN 110 as shown on FIG. 2b, wherein the SA 232 and DA 234 values are exchanged and wherein the SA 212 and the DA 214 values are also exchanged. The HA 130 decapsulates the packet by removing the second header 230 and restoring the first header 210 as the actual, effective header, and forwards the packet with the format of FIG. 2a towards the CN 120.

In the hereinabove described solution for mobility using bidirectional tunneling, each data packets flowing between the MN 110 and the CN 120 is tunneled inside another packet that carries the data between the MN 110 and the HA 130. The size of an IPv6 header is a minimum of 40 bytes. Embedding one header within a packet and adding another header adds significant overhead per packet, and may constitute an inefficient use of transmission resources between the MN 110 and the HA 130. In streaming applications such as in the case of voice over IP (VoIP), the amount of overhead may easily exceed the size of the useful payload. While large overheads may be tolerable in some wired links, the MN 110 frequently is a wireless terminal, connected towards the HA 130 on a wireless link. Even when the MN 110 is not directly connected to the HA 130 on the wireless link, for example when the wireless link exists solely between the MN 130 and a radio base station of a cellular network (not shown), the added overhead caused by tunneling may be deemed inefficient.

Header compression techniques have been used with success to reduce the amount of overhead over wireless links. For example, the well-known Robust Header Compression (ROHC) technique may be used to efficiently reduce the overhead in transmitting IP packets over a wireless link. However, this specific header compression technique can only be applied between two endpoints that terminate an IP connection, because both endpoints need to keep track of any change in the uncompressed headers in order to signal to each other when header changes occur. For example, upon transmission error over a wireless link, header information may change and a mechanism in ROHC may be used to indicate that several upcoming packets will not have any header compression. Otherwise stated, ROHC only applies over one IP hop. For example, ROHC could be applied to reduce the size of the second header 230 of FIG. 2b. But because the HA 130 does not terminate an IP connection between the MN 110 and the CN 120, this IP connection being defined by the first header 210 of FIGS. 2a and 2b, ROHC cannot be applied to reduce the overhead posed by the first header 210.

There is currently no efficient means for reducing the overhead of an encapsulated header in the context of mobile IP communication.

SUMMARY OF THE INVENTION

There would be clear advantages of having a method and nodes for alleviating bandwidth wastage problems caused by the use of two adjacent IP headers over tunneled data paths.

It is therefore a broad object of this invention to provide a method, a mobile node and a home agent for replacing an encapsulated, inner IP header with a tunnel identifier.

A first aspect of the present invention is directed a method of tunneling a data packet between a first node and a second node. The data packet comprises a payload and a first header. The first node sends towards the second node a modified data packet that comprises the payload, a second header, which itself comprises an address of the first node and an address of the second node, and a tunnel identifier. The modified data packet is received at the second node. The second node uses the tunnel identifier to identify a third node.

A second aspect of the present invention is directed to a variant of the method of tunneling a data packet, wherein the first node is a home agent, the second node is a mobile node and third node is a correspondent node communicating with the mobile node. The home agent stores a table comprising identities of a plurality of mobile nodes. In the table are stored, for each particular mobile node, a home address of the particular mobile node, an address of a particular correspondent node communicating with the particular mobile node, and a tunnel identifier value corresponding to the particular correspondent node.

A third aspect of the present invention is directed to another variant of the method of tunneling a data packet, wherein an address of the particular correspondent node is received at the home agent from the particular mobile node in a binding update message. The home agent assigns the corresponding tunnel identifier value. The corresponding tunnel identifier value is then sent by the home agent towards the particular mobile node in a binding acknowledgement message.

A fourth aspect of the present invention is directed to yet another variant of the method of tunneling a data packet, applied to a point-to-multipoint distribution network. A relationship is defined in the first node between a multipoint address, the address of the second node and an address of a fourth node. The first header comprises the multipoint address. The first node sends towards the second and fourth nodes modified copies of the data packet.

A fifth aspect of the present invention is directed to a mobile node. The mobile node comprises an access interface, a memory, an application, and a session management unit. The access interface sends and receives messages and data packets. The memory stores a care-of address, an IP address of a home agent and a mapping table containing relations between tunnel identifiers and IP addresses of correspondent nodes. The application makes and uses contents of data packets. The session management unit receives from the application a data packet and an identity of a correspondent node. It adds to the packet an IP header comprising the care-of address and the IP address of the home agent. It also adds to the packet a tunnel identifier that is mapped in the mapping table to the identified correspondent node. The session management unit finally requests from the access interface sending of the data packet towards the home agent.

A sixth aspect of the present invention is directed to a home agent. The home agent comprises a network interface, a memory and a processor. The network interface sends and receives messages and data packets. The memory stores an IP address of the home agent, a binding cache having relations between home addresses and care-of addresses of mobile nodes, and a mapping table having relations between home addresses of mobile nodes, IP addresses of correspondent nodes and tunnel identifier values. The processor receives from the network interface a downstream data packet comprising a first header, reads from the first header an IP address of a correspondent node and a home address of a mobile node, reads from the mapping table a tunnel identifier value corresponding to the IP address of the correspondent node and to the home address of the mobile node, and reads from the binding cache a care-of address corresponding to the home address of the mobile node. The processor then builds a second header comprising the care-of address of the mobile node and the IP address of the home agent, removes the first header from the downstream data packet, and adds the second header and the tunnel identifier to the downstream data packet. Finally, the processor requests the network interface to send the downstream data packet towards the mobile node.

BRIEF DESCRIPTION OF THE DRAWINGS

For a more detailed understanding of the invention, for further objects and advantages thereof, reference can now be made to the following description, taken in conjunction with the accompanying drawings, in which:

FIG. 3a shows an exemplary mapping table of home addresses, correspondent node IP addresses and tunnel identifier values stored in a home agent according to an aspect of the present invention;

FIG. 3b shows an exemplary mapping table of correspondent node IP addresses and tunnel identifier values stored in a mobile node according to an aspect of the present invention;

DETAILED DESCRIPTION

The innovative teachings of the present invention will be described with particular reference to various exemplary uses and aspects of the preferred embodiment. However, it should be understood that this embodiment provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the description of the figures, like numerals represent like elements of the invention.

Figure 1:
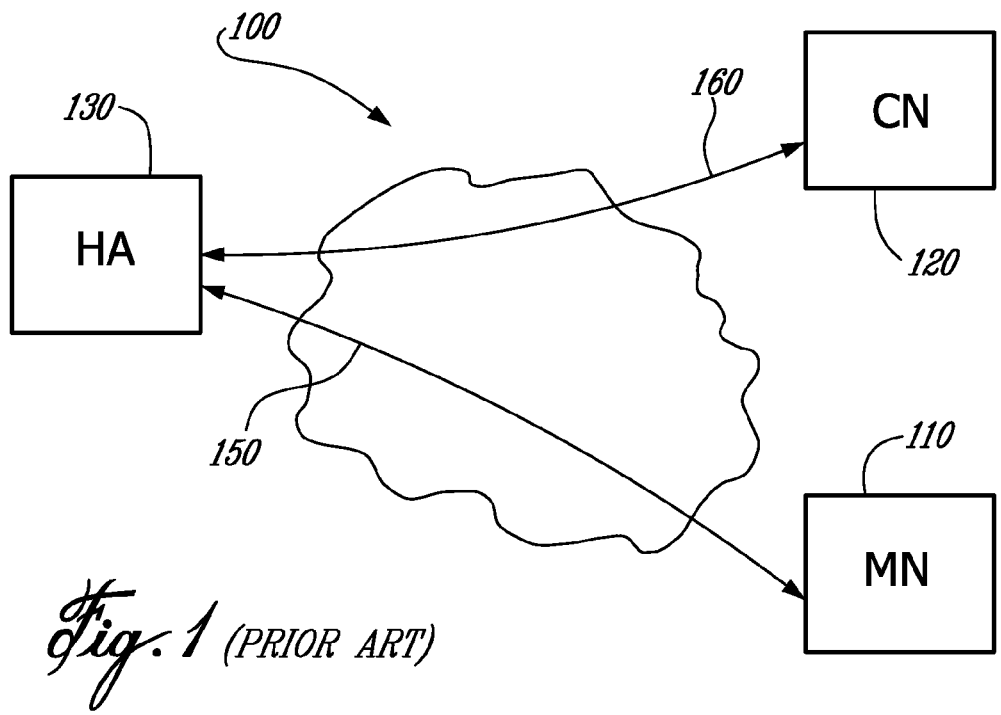
FIG. 1 is a prior art representation of a correspondent node in communication with a mobile node within an IP network using mobile IP version 6 in bidirectional tunneling mode.

The present invention provides a method, a mobile node and a home agent for exchanging packet data traffic between the mobile node and the home agent, when the mobile node is roaming outside of a home network of the mobile node, while reducing the amount of overhead required to properly route the packet data. Returning to FIG. 1, which is a prior art representation of a correspondent node (CN) 120 in communication with a mobile node (MN 110) within an IP network 100 using mobile IP version 6 in bidirectional tunneling mode, the MN 110 is shown away from a home agent (HA) 130 because it is roaming into a foreign network. In many instances, the link between the CN 120 and the HA 130 is implemented over wired connections having high bandwidth. The link between the HA 130 and the MN 110 may be in part implemented over wired connections as well. However, at least a part of the HA 130 to MN 110 connection may be over a wireless link, especially a last segment of a path leading to a physical port of the MN 110.

The MN 110 sends a signal to the HA 130 to inform it that a tunnel reduction mechanism as set forth in the present invention will be utilized. It can do so by setting an indication, for example a one-bit flag, in a binding update message sent to the HA 130. The MN 110 also includes a list of one or more CNs 120 that it is communicating with, and for which communications it intends to use the tunnel reduction mechanism. The HA 130 receives the binding update message and, for each CN 120 in the list, allocates a tunnel identifier (TID). The TID is unique per MN 110 attached to the HA 130, and uniquely identifies the tunnel set up between the MN 110 and the HA 130.

The HA 130 stores a table showing a mapping between the IP addresses of the CNs 120 and corresponding TID values into an internal data structure. FIG. 3a shows an exemplary mapping table of home addresses (HoA), CN IP addresses and TID values stored in a HA according to an aspect of the present invention. The exemplary mapping table is shown for one particular MN in communication with two particular CNs. Those skilled in the art will recognize that the mapping table as stored in the HA would map HoAs of a large number of MNs, each MN being connected to one or to a plurality of CNs. The table of FIG. 3a is simplified for clarity. Corresponding TID values are assigned in the mapping table for the particular MN, on such TID value for each of the particular CNs that is in communication with the particular MN. The TID values in the mapping table must be unique per MN, but may optionally be reused between distinct MNs.

Having stored its own mapping table information, the HA then communicates to the particular MN a part of the mapping information, showing relations between the IP addresses of the particular CNs and the corresponding TID values, in a binding acknowledgement message. FIG. 3b shows an exemplary mapping table of CN IP addresses and TID values stored in a MN according to an aspect of the present invention. The exemplary content of the table of FIG. 3b corresponds to the content of the particular MN having the HoA equal to X1.X2.X3.X4 of FIG. 3a. While FIG. 3b illustratively shows the IP addresses of the two particular CNs and the two corresponding TID values, it is to be understood that this is not a limitation of the present invention and any MN may be in communication with one or with a plurality of CNs.

Generally, for any MN build according to the present invention, after receiving the binding acknowledgement message, in order to send a data packet towards the CN, the MN prepares a packet comprising a payload, a first (or inner) header comprising its HoA as the source address and the IP address of the CN as the destination address, and a second (or outer) header comprising its CoA as the source address and the IP address of the HA as the destination. The MN looks up in the table of FIG. 3b in order to find an entry with the IP address of the CN. If no entry is found, the packet comprising both full headers is sent. Otherwise, the MN does not send the resulting packet unmodified. Instead, it replaces the inner IP header of the packet with the TID value from the table of FIG. 3b.

Once the packet reaches the HA, the HA considers the source address of the packet, comprised in the second (outer) header. This source address corresponds to the CoA of the MN. The HA uses conventional binding information linking the HoA and the CoA of the MN to properly identify the MN by use of its HoA. The HA then uses the HoA of the MN and the TID to look up in the mapping table described in FIG. 3a and obtain the address of the CN. Using this information, the HA can recreate the contents of the inner IPv6 header, whose source address is the MN HoA and whose destination address if the CN IP address. The HA then forwards the packet to the CN, the packet now comprising only the inner IPv6 header and the payload. The HA and the MN do the same operations in reverse for the data flowing from the CN to the MN.

Figure 4:
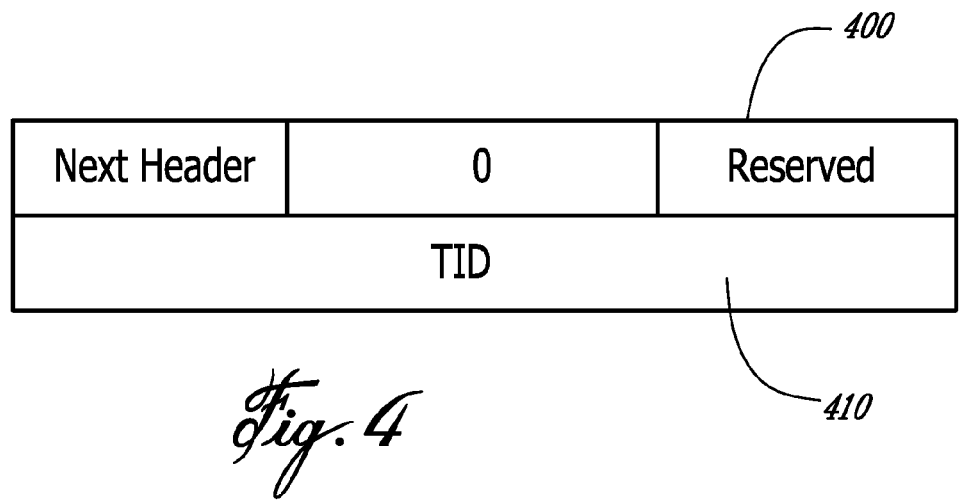
FIG. 4 describes a tunnel identifier extension header as defined in a preferred embodiment of the present invention.

While the TID may have any value that brings a reduction of overhead compared to the use of a complete, 40-byte inner header, in a preferred embodiment, the TID has a 32-bit length. This allows each MN 110 to have simultaneous conversations with up to 4 billion CNs 120. Preferably, the TID value is comprised in an IPv6 extension header. Extension headers are defined in the Request For Comments (RFC) 1883—Internet Protocol, Version 6 (IPv6) specification of the Internet Engineering Task Force (IETF). Extension headers are generally 8 bytes long. FIG. 4 describes a TID extension header 400 as defined in a preferred embodiment of the present invention. The exemplary 32-bit TID allocated by the HA is inserted into a TID field 410 of the TID extension header 400. The MN uses this header 400 to prepare the packet for sending towards the HA.

Figure 2A:
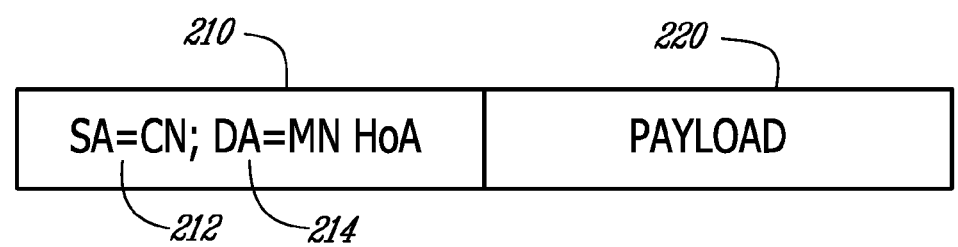
FIG. 2a represents a prior art packet format used between a home agent and a correspondent node.
Figure 2B:
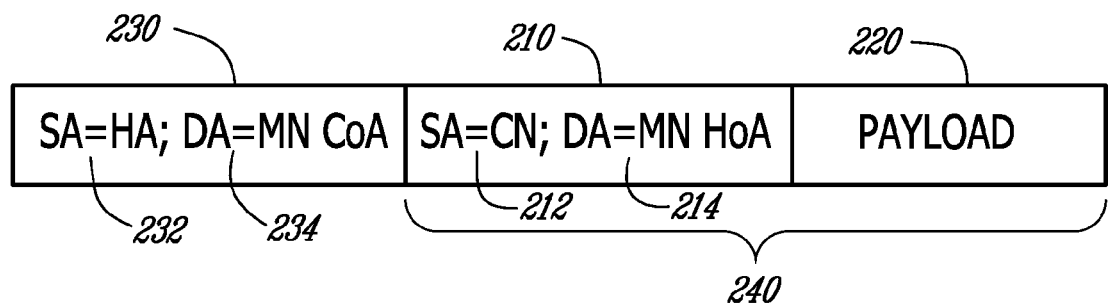
FIG. 2b represents a prior art packet format used between a mobile node and a home agent.
Figure 5:
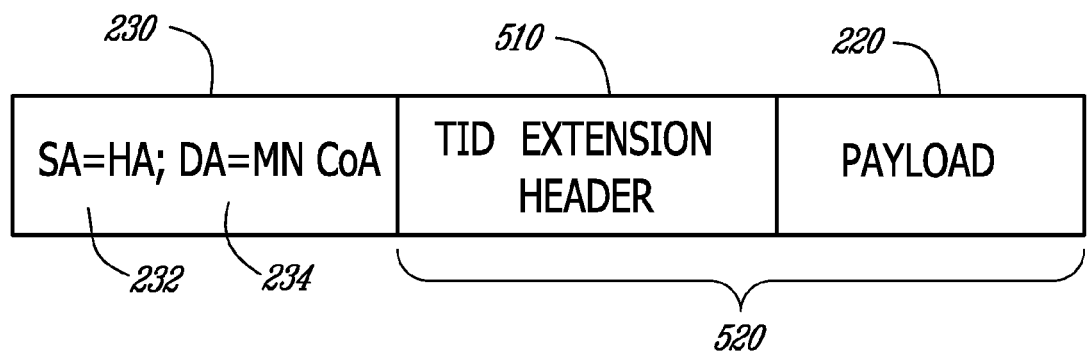
FIG. 5 shows a modified packet format as per the present invention.

FIG. 5 shows a modified packet format as per the present invention. A packet sent with the format as illustrated would be transmitted on the tunneled data path 150 of FIG. 1 in the HA to MN direction, because the SA 232 points to the HA and the DA 234 points to the CoA of the MN. In a reverse direction, the SA 232 and the DA 234 would exchange their values. Compared to the format as shown on FIG. 2b, the modified packet format comprises an identical payload 220 and an identical second header 230. But the first header 210 has been replaced by a TID extension header 510. While the first and second IP headers have a minimum typical length of 40 bytes, the TID extension header 510 has a typical length of 8 bytes only. From the standpoint of any router location on the tunneled data path 150, the TID extension header 510 is part of a payload 520 of the packet depicted on FIG. 5.

Figure 6:
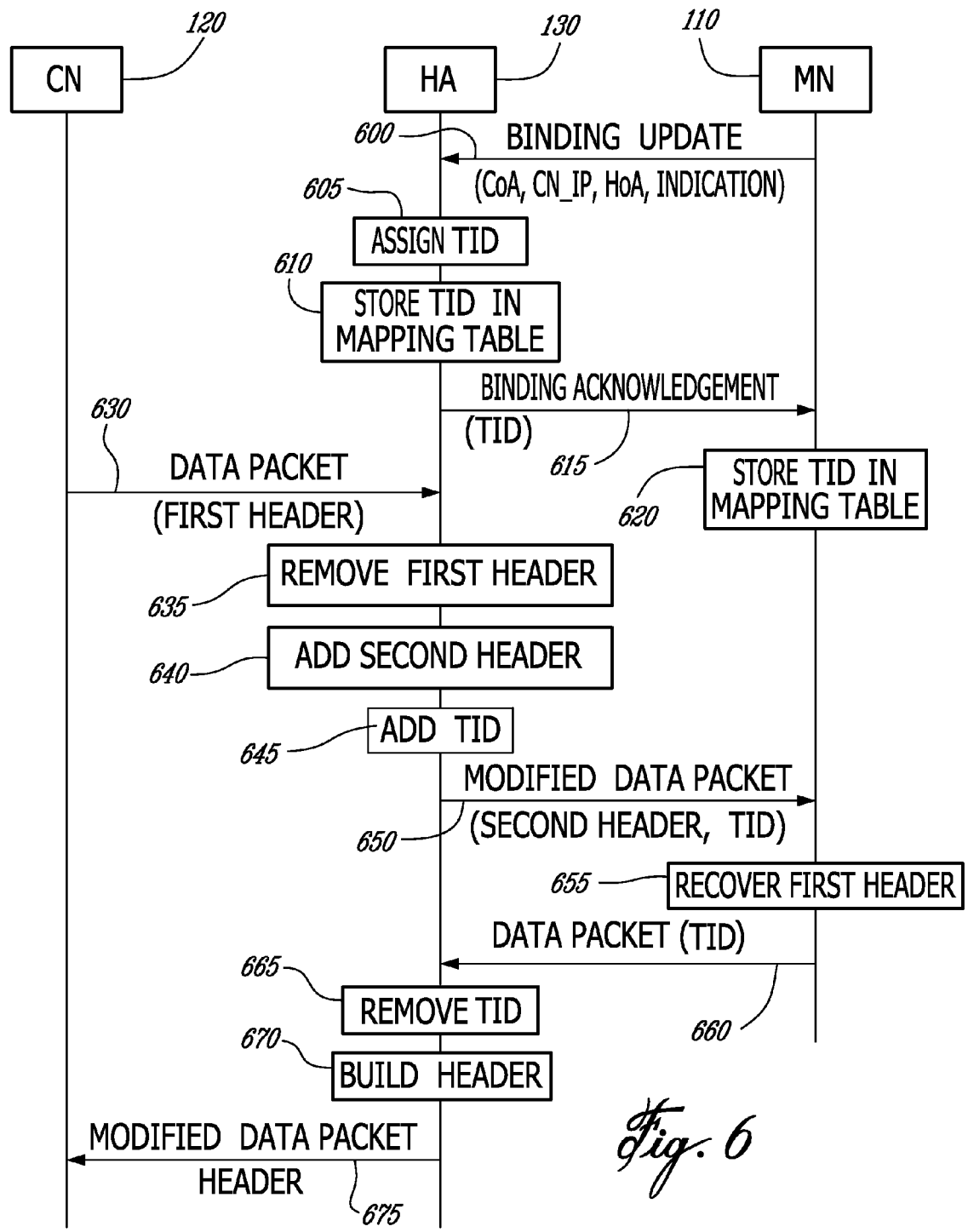
FIG. 6 shows an exemplary sequence diagram depicting how a mobile node and a home agent exchange, and then use, tunnel identifier information.

Reference is now made to FIG. 6 which shows an exemplary sequence diagram depicting how the MN and HA exchange, and then use, TID information. The diagram shows events that may take place in a mobile IP (MIP) network, in a hierarchical mobile IP (HMIP) network, in a proxy mobile IP (PMIP) network, in a Code Division Multiple Access (CDMA) 2000 mobile network, in a Long Term Evolution (LTE) mobile network, or in other types of networks. The sequence starts at step 600 when the MN 110 sends a binding update message towards the HA 130, the binding update comprising the HoA of the MN, a CoA that the MN has acquired in a foreign network, an IP address of a CN 120 that the MN wants to communicate with, and may comprise an indication that the MN intends to use the tunnel overhead reduction method of the present invention. The binding update may optionally comprise IP addresses of several CNs that the MN intends to communicate with; the following mentions a single CN for simplification of the description. Upon receipt of the binding update, the HA 130 creates a binding cache entry linking together the HoA and the CoA of the MN, as is well known in the art. Responsive to the presence of the indication in the binding update, or in all cases in embodiments where the features of the present invention are not optional, the HA 130 assigns a TID value for use by that MN in communicating with the CN at step 605. The TID value needs to be unique for this MN. Given that, in the preferred embodiment, the TID value comprises 32 bits, requiring unicity of the TID value is not difficult to achieve. At step 610, the HA 130 stores in the mapping table of FIG. 3a a relation of the MN HoA, CN IP address and TID. At step 615, the HA 130 responds by sending towards the MN 110 a binding acknowledgement message comprising the TID. The MN stores the TID in the mapping table of FIG. 3b, in relation with the CN IP address, at step 620.

A next event occurs when either the CN 120 or the MN 110 sends a packet towards the opposite end. For example at step 630, the CN 120 may send a data packet intended for the MN 110. The data packet, also called downstream data packet because of its direction from the CN 120 towards the MN 110, comprises a first header, wherein a source address is set to the CN IP address and a destination address is set to the MN HoA. The data packet arrives as the HA 130. Because the TID has earlier been stored in the mapping table, the HA 130 removes the first header from the data packet at step 635. If may add a second header at 640, if no means to reduce or otherwise compress headers in a direct path between the HA 130 and the MN 110 is currently being used. The HA 130 also adds the TID value to the data packet at step 645. In a preferred embodiment, the TID value is added as an IPv6 extension header, as described in FIG. 4. The modified data packet is sent towards the MN 110 at step 650. At step 655 the MN 110, using the TID value extracted from the modified data packet to look into its mapping table, recovers information from the first header. Those skilled in the art will recognize that it may not be necessary for the MN 110 to fully reconstruct at step 655 the original first header in its complete format and content. The MN 110 may simply need to identify, for example, the CN 120 having originated the data packet. In another example, the MN 110 may send another data packet, also called upstream data packet, intended for the CN 120. The MN 110 builds the data packet using a payload for the CN 120, adding a TID and optionally adding an outer header comprising its CoA as a source address and the IP address of the HA 130 as a destination address. The outer header may not be present if it is replaced by use of a header compression technique used between the MN 110 and the HA 130. The data packet is sent towards the HA 130 at step 660. At step 665, the HA extracts the TID from the data packet and removes any outer header that may have been inserted by the MN 110. Using the TID, the HA 130 locates in its mapping table the IP address of the CN 120. The HoA of the MN 110 is preferably also used to identify the proper CN 120 from the mapping table. Using the CoA, the HA 130 obtains the HoA from its binding cache. The CoA of the MN 110 may either be comprised in the outer header, if present, or obtained by decompressing any information that may have been used in support of header compression between the MN 110 and the CN 120. At step 670, the HA 130 builds a new header comprising the IP address of the CN 120 as a destination address and the HoA as a source address.

The first header that is replaced by the TID on a link between the HA 130 and the MN 110 may change from time to time. Any change that may impact the first header is solely handled between the CN 120 and the HA 130. For example, any transmission error that may happen between the CN 120 and the HA 130 would fully be resolved by these two nodes. As such, in contrast with a use of a ROHC compressed header over the link between the HA 130 and the MN 110, the TID value remains invariant over the same link, from one packet to the next. The steps 630 to 655 and the steps 660 to 675 may be repeated as many times as there are data packets to be sent between the CN and the MN.

It can be observed that the tunnel overhead reduction mechanism of the present invention requires no impact to the design, build, or configuration of the CN 120. Also, because IP extension headers are only looked at by the endpoints of an IP connection, any node, router, gateway, access node, base station, and the like found in the path between the MN 110 and the HA 130 are not impacted by the addition of the TID or by the removal of the inner header to any number of data packets.

Figure 7:
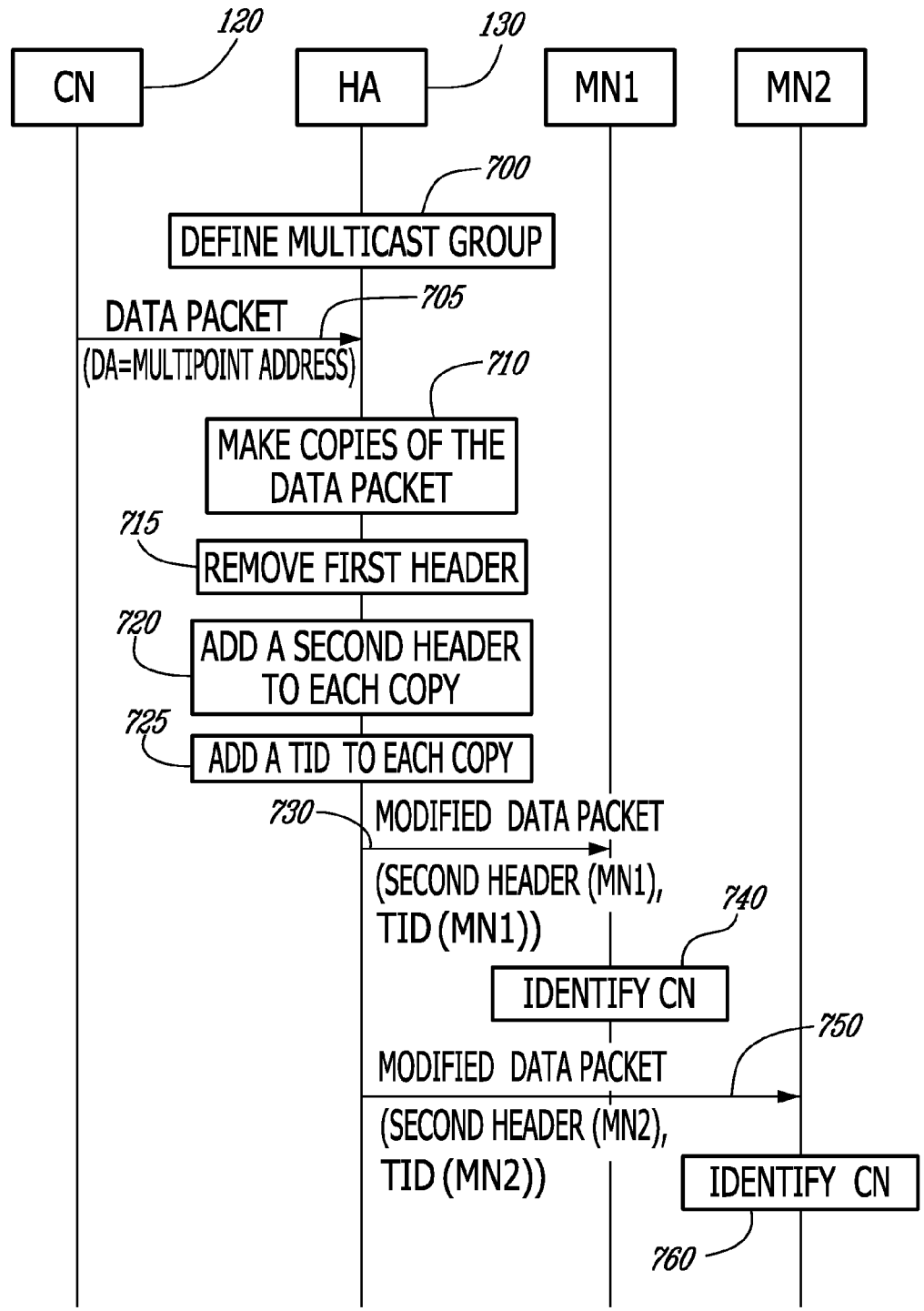
FIG. 7 shows a method of tunneling in a point-to-multipoint distribution network.

Another use of the method of the present invention will now be described in relation with FIG. 7, which shows a method of tunneling in a point-to-multipoint distribution network. The point-to-multipoint distribution network comprises a CN 120, a HA 130 and at least 2 MNs, identified as MN1 and MN2. Both MN1 and MN2 have initially sent binding updates to the HA 130, indicating their desire to communicate with CN 120, both indicating that they want to use the tunnel overhead reduction mechanism of the present invention. Accordingly, the HA 130 has stored CoAs for both of MN1 and MN2. The steps 600-620 described in relation with FIG. 6 have been executed independently for both of MN1 and MN2.

At step 700, the HA 130 defines a relationship between a multicast group comprising HoAs of the MN1 and MN2 and a multicast address. This relation implies that any packet data received with the multicast address as a destination address is to be sent towards all addresses within the group. Those skilled in the art will recognize that, in most embodiments, the multicast group could comprise a much larger number of members. Accordingly, the description of FIG. 7 is simplified for ease of understanding. The step 700 may be executed at any time before or after the steps 600-620 of FIG. 6, as these are fully independent processes. However, all of the steps 600-620 and 700 are required to be processed before the next steps described in relation with FIG. 7.

At step 705, the CN 120 sends a data packet towards the HA 130. A destination address (DA) included in a first header of the data packet is set equal to a multicast address, thereby making the data packet a multipoint data packet. The HA 130 makes at step 710 copies of the data packet; the number of copies being equal to the number of MNs in the multicast group. In each copy of the data packet, the HA 130 removes the first header from the data packet at step 715. At step 720, the HA 130 adds to each copy a second header comprising, as a source address, the IP address of the HA 130 and, as a destination address, the CoA of one of the MNs towards which the copy is to be sent. At step 725, the HA 130 adds to each copy the TID previously defined for one of the MNs towards which the copy is to be sent. Of course, a second header added to a copy intended for sending towards a given MN comprises the CoA of that given MN, so the term "second header" applies distinctly to each copy. Likewise, the HA 130 ensures that distinct copies carry a corresponding TID for each corresponding MN. At steps 730 and 750, the HA 130 sends modified copies of the data packet towards MN1 and MN2, each copy carrying the CoA and TID for the corresponding MN. Each of the MN1 and MN2 can identify the CN 120, at steps 740 and 760, by use of the corresponding TID values received in the modified copies of the data packet.

Figure 8:
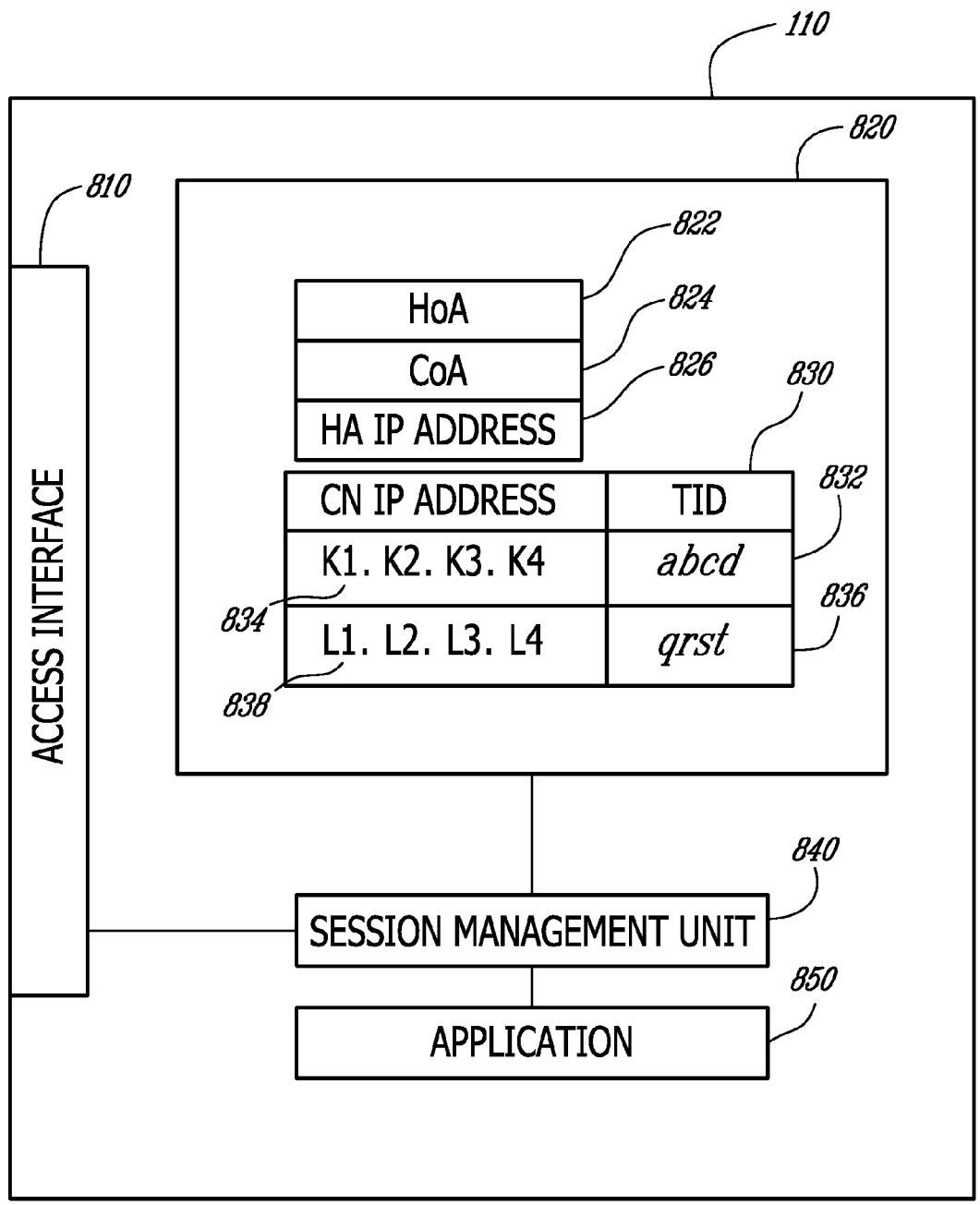
FIG. 8 shows an exemplary mobile node built according to the present invention.

An exemplary construction of an MN 110 as used in the preceding figures will now be described by reference to FIG. 8, which shows an exemplary MN 110 built according to the present invention. The MN 110 may be implemented in hardware, software, or any combination thereof. The MN 110 comprises at least one access interface 810, used to communicate with CNs through a connection to the HA of its home network and, when away from its home network, through a connection to foreign networks. The access interface 810 might be a CDMA 2000 interface, a wireless local area network (WLAN) interface, and the like. Those of ordinary skills in the art will understand that other access interfaces might also be supported by the MN 110 of the present invention, comprising, by way of examples, a cable connection, an Ethernet connection, a wideband code division multiple access (WCDMA) interface, a general packet data service (GPRS), and the like.

The MN 110 further comprises a memory 820, a session management unit 840 and one or more applications 850. The memory 820 comprises at least a HoA 822 allocated by the home network of the MN and a HA IP address 826, wherein the HA is part of the home network. If the MN 110 is located in and receiving access from a foreign network, the memory 820 also contains a CoA 824. The memory 820 further comprises a mapping table 830 as described in relation with FIG. 3b. For each CN that the MN 110 is in communication with, a TID value 832 or 836 may be stored along with a CN IP address 834 or 838.

The session management unit 840 controls sessions with the CNs, sends binding updates and upstream data packets, and receives binding acknowledgements and downstream data packets through the access interface 810. The session management unit 840 also handles receiving and storing addresses for MN 110. It detects a location of the MN 110 by determining whether or not the MN 110 is connected to a home network. If a foreign network is being visited, the session management unit 840 acquires the CoA in the well-known manner.

Each of the memory 820, the session management unit 840 and the one or more applications 850 may be implemented in many ways including, but not limited to, hardware, software, firmware or combination thereof.

When the session management unit 840 of the MN 110 initially establishes a new session with a selected CN while roaming inside a foreign network, the session management unit 840 requests the access interface 810 to send a binding update message towards the HA, the message comprising the HoA 822, the CoA 824, and the CN IP address 824 or 838 corresponding to the selected CN. The session management unit 840 may request the access interface 810 to add to the binding update an indication that tunnel overhead reduction is desired. The access interface 810 receives a binding acknowledgement that confirms that the HA has properly connected the HoA and the CoA. The binding acknowledgement may further comprise a TID value, which is stored in the memory as TID value 832 or 836, as appropriate for the selected CN.

The application 850 may build a packet comprising a useful content, or payload, intended to be sent towards the selected CN. The packet built by the application 850 may comprise a full IP header, including the HoA 822 as a source address and the CN IP address 834 or 838 as a destination address. Alternatively, the application 850 may only provide an IP address of the CN, or a pointer that the session management unit 850 can use to point to the proper CN in the mapping table 830. Provided that there is a TID value 832 or 834 in the mapping table 830, the session management unit 850 adds the TID value to the packet, preferably in the form of a TID extension header. The session management unit then builds a header, which is actually an outer header, using the CoA 824 as the source address and the IP address of the HA 826 as the destination address. The resulting packet has the format as shown on FIG. 5. The session management unit requests the access interface 810 to send the packet towards the HA. It is to be noted that the MN may use header compression techniques to reduce the overhead caused by the outer header. In such cases, the outer header may not actually be present in the packet sent towards the HA, but may be replaced at the session management unit 850 by use of a compressed substitute.

A downstream packet may be received at the access interface 810. The access interface 810 forwards the packet to the session management unit 840. If the session management unit 840 finds a TID value in the packet, for example by looking into a TID extension header, it consults the table 830, using the TID value, to identify the proper CN having originated the packet, thereby recovering all information required to rebuild an inner header. Depending on the specifics of the application 850, the session management unit 840 may rebuilt the inner header, using the CN IP address as a source address and the HoA as a destination address. In some cases, the application 850 may only need to receive the CN IP address, or some indication of the identity of the CN. Some specific applications 850 may not even need any indication of the CN's identity.

Figure 9:
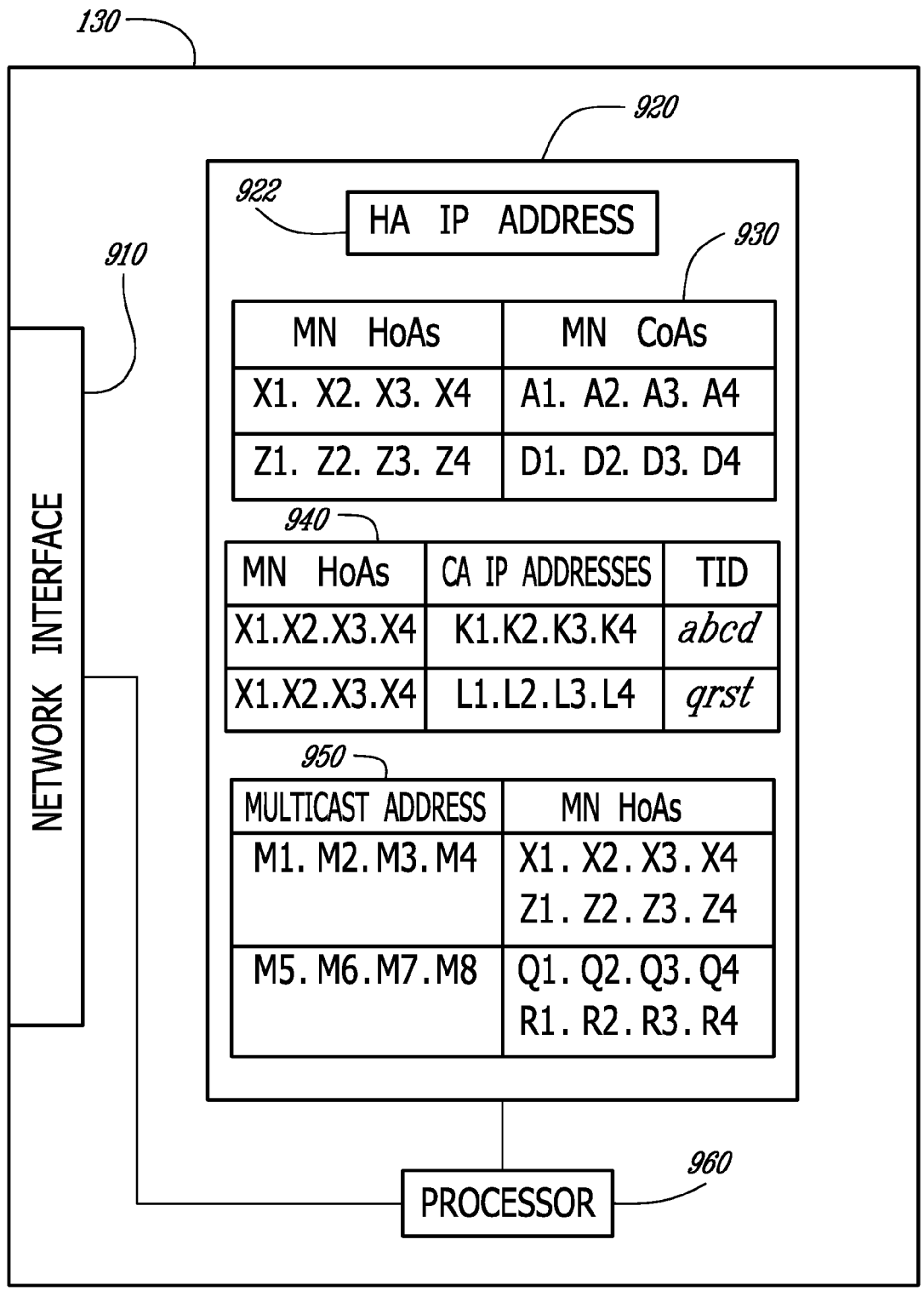
FIG. 9 shows an exemplary home agent built according to the present invention.

An exemplary construction of a HA as used in the preceding figures will now be described by reference to FIG. 9, which shows an exemplary HA 130 built according to the present invention. The HA 130 comprises at least one network interface 910, which may actually be embodied in distinct ports for sending and receiving messages and data packets. The HA 130 further comprises a memory 920 and a processor 960.

The memory 920 comprises an IP address 922 for the HA 130. It also has a binding cache 930 wherein are stored relations between HoAs and CoAs for a plurality of MNs. Mapping of HoAs and CoAs allows the HA 130 to receive signals, messages, and data packets originated from or destined to a particular MN, and forward the data packets towards their destination by translating between the HoA and the CoA of the MN, while the MN is roaming. The memory 930 further comprises a mapping table 940, which maps HoAs with CN IP addresses and TID values, as described in relation to FIG. 3*a*. The memory 930 may optionally comprise a multicast table 950.

The network interface 910 may receive from a MN a binding update message comprising a HoA, a CoA, a CN IP address, and possibly comprising an indication that the MN intends to use the tunnel overhead reduction method of the present invention. It forwards the binding update to the processor 960. The processor 960 stores in the binding cache 930 a relationship between the HoA and the CoA. If the indication is present, or in any case in embodiments wherein the features of the present invention are not optional, the processor 960 also calculates a TID value and stores it, along with the HoA and the CN IP address, in the mapping table 940. The processor 960 then instructs the network interface 910 to forward a binding acknowledgement message towards the MN.

The network interface 910 may then receive from a CN a data packet having a first header comprising a source address equal to an IP address of the CN and a destination address equal to the HoA of a MN. The network interface 910 forwards the packet to the processor 960. The processor 960 looks in the binding cache 930 to find a HoA that matches the destination address. If found, the processor 960 reads the CoA. The processor 960 then looks at the mapping table 940 to find an entry that matches both the HoA and the CN IP address. If found, the processor 960 reads the TID value. The processor 960 then builds a second header comprising the HA IP address 922, obtained from the memory 920, as a source address, and the CoA of the MN as the destination address. The processor 960 removes the first header from the packet, adds the second header, and adds the TID value, preferably within a TID extension header, to the packet. The processor 960 instructs the network interface 910 to send the resulting data packet, which now has a format as shown on FIG. 5, towards the MN.

Of course, the HA 130 may use a header compression technique, such as ROHC, in sending data packets towards the MN. In such a case, the second header may not actually be present in the data packet as sent from the network interface 910, but may be replaced by the processor 960, using a suitable compressed substitute as is well known in the art of header compression. Also, if no TID value is found for the combination of the HoA and of the CN IP address within the mapping table 940, the processor 960 builds the second header, adds it to the packet while preserving the first header, and then instructs the network interface 910 to send the resulting data packet, with a format as shown on FIG. 2*b*, towards the MN.

The network interface 910 may also receive from the MN a data packet having an outer header comprising a source address equal to the CoA of the MN and a destination address equal to the HA IP address 922. The network interface 910 forwards the packet to the processor 960. The outer header may be replaced by a compressed substitute, in which case the processor 960 first decompresses the substitute to recover normal outer header information. The processor 960 looks within the packet to determine whether it comprises a TID value or an inner header. If an inner header is found, comprising the HoA of the MN as a source address and a CN IP address as a destination address, the processor 960 removes the outer header from the packet and instructs the network interface 910 to forward the packet towards the CN. If however a TID value is found, the processor 960 uses the CoA to locate the corresponding HoA from the binding cache 930. The processor 960 then uses the HoA and the TID value to locate the CN IP address in the mapping table 940. The processor then builds an inner header comprising the HoA as a source address and the CN IP address as a destination address, removes the outer header from the packet, and adds the inner header to the packet. The processor 960 then instructs the network interface 910 to send the data packet towards the CN.

It can be observed that using the CoA to locate the HoA in the binding cache 930 prior to looking for the TID value within the mapping table 940 may not be required if the TID value is unique within the entire mapping table 940.

A data packet received from a CN at the network interface 910, and forwarded to the processor 960, may comprise in a first header a source address corresponding to a CN IP address, and a destination address that maps on a multicast address found in the multicast table 950. The exemplary multicast table 950 shows two multicast addresses, each of which is mapped to two HoAs. The multicast table 950 of FIG. 9 is simplified for ease of illustration; a typical multicast table 950 may comprise a multiplicity of multicast addresses, each of which being mapped to a plurality of HoAs. If the processor 960 finds that the destination address is a multicast address, it reads from the multicast table 950 HoAs for all MNs that are related to the multicast address. The processor 960 then reads, for each MN, the CoA corresponding to the HoA of the MN in the binding cache 930. It then looks in the mapping table 940 for a TID value corresponding to the CN IP address received as the source address and to each HoA. For each MN, the processor builds a modified copy of the received data packet, wherein the first header originally received is deleted, a TID value corresponding to the relevant MN is added and a new header, having a source address equal to the HA IP address 922 and a destination address equal to the CoA for the relevant MN, is added. The processor 960 instructs the network interface 910 to forward each copy of the packet towards the relevant MN.

Although several aspects of the preferred embodiment of the method, of the mobile node and of the home agent of the present invention have been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

The invention claimed is:

1. A method of tunneling a data packet between a mobile node (MN) and a home agent (HA), the data packet comprising a payload and a first header, the method comprising:

sending a binding update message from the MN towards the HA, the binding update comprising a home address of the MN, a care-of address of the MN, an IP address of a correspondent node (CN) and an indication that tunnel overhead reduction is desired;

receiving, at the MN, a binding acknowledgement message from the HA, the binding acknowledgement message comprising a tunnel identifier (TID) value corresponding to the CN, the TID value being assigned by the HA; and receiving from the HA at the MN a modified data packet comprising:
the payload;
a second header comprising the care-of address of the MN and an address of the HA, and
the TID value; and using the TID value at the MN to identify the CN.

2. The method of claim 1 further comprising tunneling another data packet, the other data packet comprising another payload and another first header, between the MN and the HA by:
receiving from the MN at the HA another modified data packet comprising:
the other payload;
the second header, and
the TID value;
using the TID value at the HA—to identify the CN.

3. The method of claim 2, further comprising:
at the HA, removing from the other modified data packet the second header and the TID value; and
sending from the HA towards the CN a further modified data packet comprising a reconstructed other first header and the other payload.

4. The method of claim 2, wherein:
the MN sends a plurality of data packets towards the HA, each of the plurality of data packets comprising a copy of the other first header; and
each of the plurality of data packets is modified by removing the copy of the other first header and by adding a copy of the TID value and a copy of the second header.

5. The method of claim 1, wherein:
the HA stores a table comprising identity of the MN, the table further comprising:
a home address (HoA) of the MN,
the address of the CN, and
the TID value corresponding to the CN.

6. The method of claim 5, wherein:
the MN stores a relation between the address of the CN and the TID value.

7. The method of claim 1, wherein:
the MN and the HA are part of a mobile network;
the addresses of the MN and the HA are Internet Protocol (IP) addresses and
the mobile network uses a protocol selected from the group consisting of a mobile IP protocol, a hierarchical mobile IP protocol and a proxy mobile IP protocol.

8. The method of claim 1, wherein:
the TID value is invariant.

9. The method of claim 1, wherein:
a relationship is defined between a multipoint address, the address of the HA and an address of a fourth node;
the first header comprises the multipoint address; and
the MN further sends towards the fourth node another modified data packet.

10. The method of claim 9, wherein:
the other modified data packet comprises the payload, a third header comprising the care-of address of the MN, the address of the fourth node, and a distinct TID value;
the method further comprising the steps of:
receiving at the fourth node the other modified data packet; and
using at the fourth node the distinct TID value to identify the CN.

11. A mobile node, comprising:
an access interface for sending and receiving messages and data packets;
a memory for storing a care-of address, an IP address of a home agent and a mapping table containing relations between tunnel identifiers and IP addresses of correspondent nodes;
an application for making and using contents of data packets; and
a session management unit for requesting from the access interface sending of a binding update message towards the home agent, the binding update message comprising a home address, the care-of address, the IP addresses of one or more correspondent nodes and an indication that tunnel overhead reduction is desired, for receiving from the application a data packet and an identity of a correspondent node, for adding to the data packet an IP header comprising the care-of address and the IP address of the home agent, for adding to the data packet a tunnel identifier that is mapped in the mapping table to the identified correspondent node, and for requesting from the access interface sending of the data packet towards the home agent.

12. The mobile node of claim 11 wherein the session management unit is further for receiving from the access interface a downstream data packet, for reading from the downstream data packet a tunnel identifier, for reading from the mapping table an identity of a correspondent node by use of the tunnel identifier and for forwarding to the application a content of the received data packet along with the identity of the correspondent node.

13. The mobile node of claim 11 wherein:
the access interface is further for receiving a binding acknowledgement message and for forwarding the binding acknowledgement message to the session management unit; and
the session management unit is further for reading from the binding acknowledgement message tunnel identifier values and for storing the tunnel identifier values in the mapping table.

14. A home agent, comprising:
a network interface for sending and for receiving messages and data packets;
a memory for storing an IP address of the home agent, a binding cache having relations between home addresses and care-of addresses of mobile nodes, and a mapping table having relations between the home addresses of the mobile nodes, IP addresses of correspondent nodes and tunnel identifier values; and
a processor for receiving a binding update message from the network interface, for reading in the binding update message a home address and a care-of address for a mobile node, for further reading in the binding update message an IP address of a correspondent node and an indication that tunnel overhead reduction is desired, for storing in the binding cache a relation between the home address and the care-of address of the mobile node, for calculating a tunnel identifier value, for storing in the mapping table a relation between the home address, the IP address of the correspondent node and the tunnel identifier, and for requesting the network interface to send towards the mobile node a binding acknowledgement message comprising the tunnel identifier value, for receiving from the network interface a downstream data packet comprising a first header, for reading from the first header the IP address of the correspondent node and the home address of the mobile node, for reading from the mapping table the tunnel identifier value corresponding to the IP address of the correspondent node and to the home address of the mobile node, for reading from the binding cache the care-of address corresponding to the home address of the mobile node, for building a second header comprising the care-of address of the mobile node and the IP address of the home agent, for removing the first header from the downstream data packet, for adding the second header and the tunnel identifier value to the downstream data packet, and for requesting the network interface to send the downstream data packet towards the mobile node.

15. The home agent of claim 14 wherein the processor is further for receiving from the network interface an upstream data packet comprising a third header, for reading from the third header the care-of address of the mobile node, for reading from the upstream data packet the tunnel identifier value, for reading from the binding cache the home address corresponding to the care-of address, for reading from the mapping table the IP address of the correspondent node by use of the home address and of the tunnel identifier value, for building a fourth header comprising the home address of the mobile node and the IP address of the correspondent node, for removing the third header and the tunnel identifier value from the upstream data packet, for adding the fourth header to the upstream data packet, and for requesting the network interface to send the upstream data packet towards the correspondent node.

16. The home agent of claim 14 wherein:
the memory further comprises a multicast table containing a mapping between multicast addresses and home addresses of mobile nodes, wherein each multicast addresses is related to a plurality of home addresses; and
the processor is further for receiving a multicast data packet from the network interface, for reading from the multicast data packet an IP address of a correspondent node and a multicast address, for reading from the multicast table the plurality of home addresses related to the multicast address, for reading from the binding cache care-of addresses corresponding to each of the home addresses, for reading from the mapping table tunnel identifier values corresponding to the IP address of the correspondent node and to each of the home addresses, for building a plurality of headers, each header comprising the IP address of the home agent and a different one of the care-of addresses, for adding the plurality of headers and the corresponding tunnel identifier values to a plurality of copies of the multicast data packet, and for requesting the network interface to send the copies of the multicast data packet towards the mobile nodes.

\* \* \* \* \*